US012718974B2

(12) United States Patent
Onodera et al.

(10) Patent No.: US 12,718,974 B2
(45) Date of Patent: *Aug. 25, 2026

(54) MAGNETIC POWDER FOR MAGNETIC RECORDING MEDIUM, AND PRODUCTION METHOD THEREOF

(71) Applicants: DOWA ELECTRONICS MATERIALS CO., LTD., Tokyo (JP); FUJIFILM CORPORATION, Tokyo (JP)

(72) Inventors: Akifumi Onodera, Tokyo (JP); Yasuto Miyamoto, Tokyo (JP); Masaki Koshiko, Tokyo (JP); Toshio Tada, Kanagawa (JP); Takashi Fujimoto, Kanagawa (JP)

(73) Assignees: DOWA ELECTRONICS MATERIALS CO., LTD., Tokyo (JP); FUJIFILM CORPORATION, Tokyo (JP)

( * ) Notice: Subject to any disclaimer, the term of this patent is extended or adjusted under 35 U.S.C. 154(b) by 703 days.

This patent is subject to a terminal disclaimer.

(21) Appl. No.: 18/127,722

(22) Filed: Mar. 29, 2023

(65) Prior Publication Data

US 2023/0317337 A1 Oct. 5, 2023

(30) Foreign Application Priority Data

Mar. 30, 2022 (JP) ................................ 2022-054710

(51) Int. Cl.
*H01F 1/34* (2006.01)
*H01F 1/11* (2006.01)

(52) U.S. Cl.
CPC .................................. *H01F 1/348* (2013.01)

(58) Field of Classification Search
CPC ........ H01F 1/348; H01F 1/11; G11B 5/70678
See application file for complete search history.

(56) References Cited

U.S. PATENT DOCUMENTS 12,300,410 B2 * 5/2025 Koshiko ................ H01F 1/348
2012/0199782 A1 * 8/2012 Masada .............. G11B 5/70678 252/62.63

FOREIGN PATENT DOCUMENTS

JP 63-234409 9/1988
JP 2015-127984 7/2015
JP 2015-127985 7/2015

* cited by examiner

*Primary Examiner* — Matthew E. Hoban
*Assistant Examiner* — Lynne Edmondson
(74) *Attorney, Agent, or Firm* — Millen, White, Zelano & Branigan, P.C.; Christopher W. Brody

(57) ABSTRACT

[Problem] A hexagonal barium ferrite magnetic powder formed of fine particles, wherein the anisotropic magnetic field distribution of a magnetic recording medium can be made to fall within a range effective in both improving the recording density and improving the SNR is provided.
[Solution] A magnetic powder for a magnetic recording medium including magnetic particles in which Ba in hexagonal barium ferrite is partially substituted with Sr, wherein a Dx volume represented by the following formula (1) is 2,200 $nm^3$ or less, an Sr/(Ba+Sr) molar ratio is 0.01 to 0.30, and an anisotropic magnetic field distribution is 1.00 or less.

$$\text{Dx volume } (nm^3) = Dxc \times \pi \times (Dxa/2)^2 \quad (1)$$

Here, Dxc is a crystallite diameter (nm) in a c-axis direction of a hexagonal ferrite crystal lattice, Dxa is a crystallite diameter (nm) in an a-axis direction of the same crystal lattice, and π is a circular constant.

4 Claims, 2 Drawing Sheets

[Fig.1]
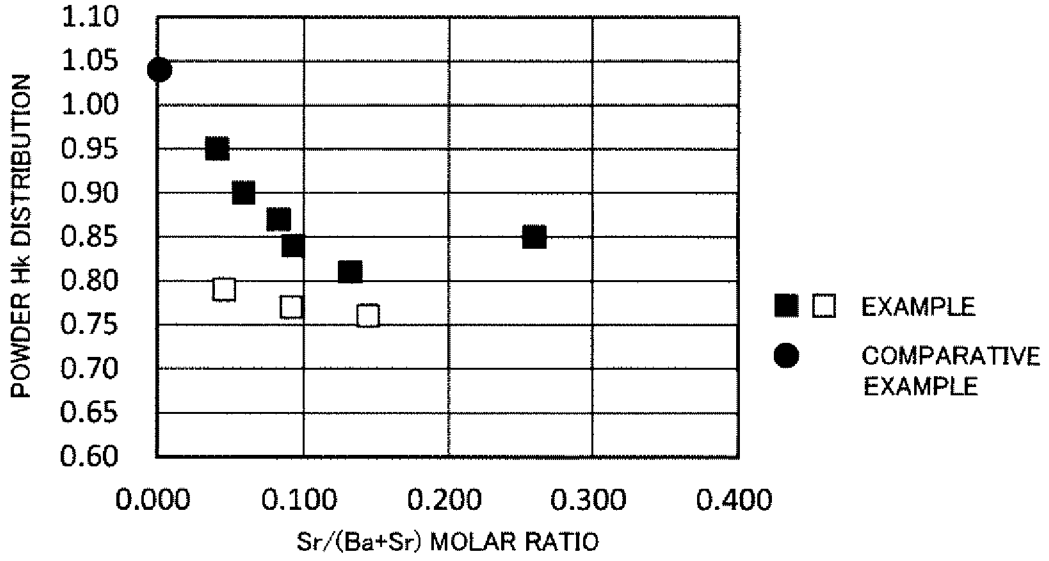
[Fig.2]
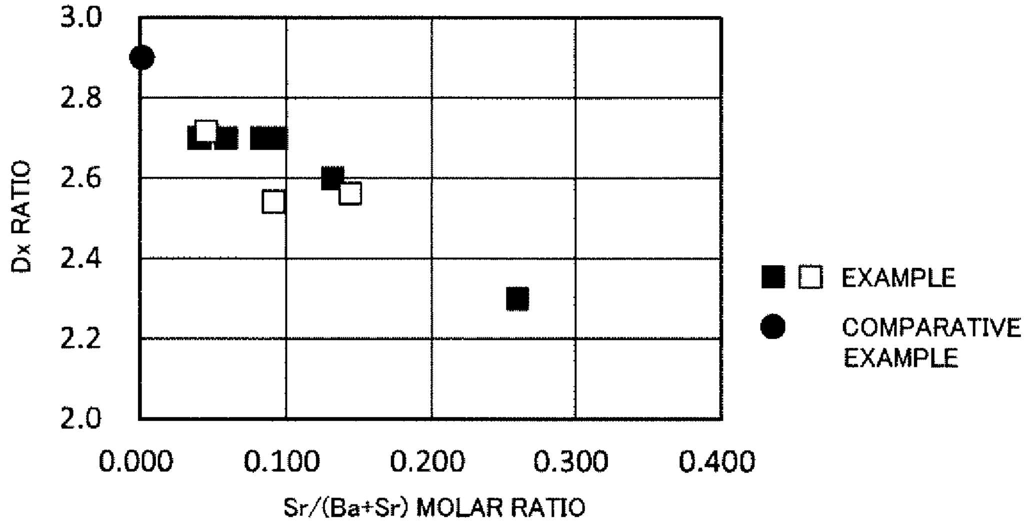

[Fig.3]
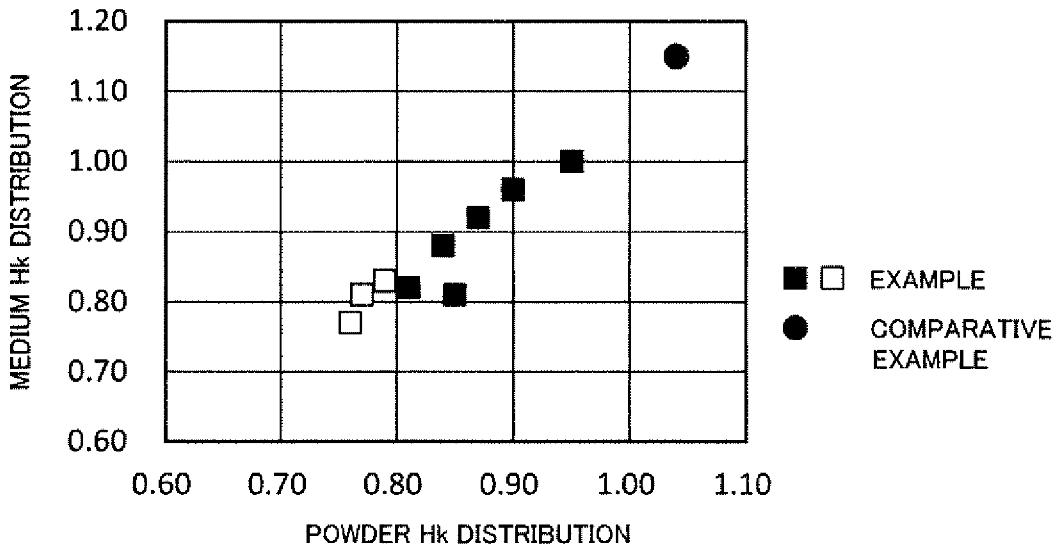
[Fig.4]
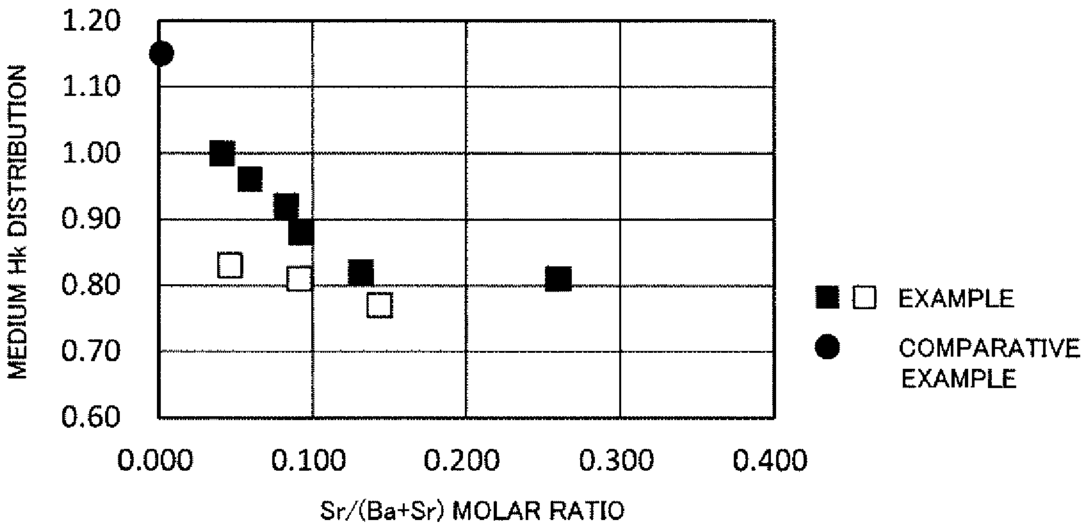

MAGNETIC POWDER FOR MAGNETIC RECORDING MEDIUM, AND PRODUCTION METHOD THEREOF

TECHNICAL FIELD

The present invention relates to a magnetoplumbite-type (M-type) hexagonal barium ferrite magnetic powder suitable for high-density recording on a magnetic recording medium, and a production method thereof.

BACKGROUND ART

An M-type hexagonal ferrite magnetic powder is known as a magnetic powder suitable for high-density recording on a magnetic recording medium. M-type hexagonal ferrite has a basic structure represented by a chemical formula $AO \cdot 6Fe_2O_3$. The element A in the chemical formula is Ba, Sr, Pb, Ca, or the like. As the M-type hexagonal ferrite for a magnetic recording medium, barium ferrite in which most of the element A is Ba or strontium ferrite in which most of the element A is Sr is generally used. Fe sites are sometimes partially substituted with a metal element such as Co, Zn, Ti, Sn, Nb, or V according to the required properties.

PTL 1 describes a hexagonal barium ferrite magnetic powder having a composition in which Fe sites are partially substituted with predetermined amounts of Ti, Zn, and Co. It is said that this improves the temperature stability of the coercivity (coercive force). It is said that as the element A, Ba and Sr may be used in combination, and in Example 7, an Sr-containing hexagonal barium ferrite magnetic powder in which an Sr/(Ba+Sr) molar ratio is 0.08 is shown.

On the other hand, it is known that hexagonal strontium ferrite has a high magnetocrystalline anisotropy constant Ku and is advantageous in enhancing the thermal stability of magnetization.

PTLs 2 and 3 describe a hexagonal strontium ferrite magnetic powder refined by incorporating Ba. Most of the element A is Sr, and the Sr/(Ba+Sr) molar ratio of the magnetic powder disclosed in PTLs 2 and 3 is about 0.5 to 0.95.

CITATION LIST

Patent Literature

[PTL 1] JPS63-234409A

[PTL 2] JP2015-127984A

[PTL 3] 0102015-127985A

SUMMARY OF INVENTION

Technical Problem

In order to improve the performance of a magnetic recording medium, it is important to improve both the recording density and the SNR (S/N ratio). From the viewpoint of improving the recording density, refinement of magnetic particles (specifically, reduction in Dx volume) is advantageous. On the other hand, it has been confirmed that the SNR (S/N ratio) of a magnetic recording medium depends on the anisotropic magnetic field distribution as a medium property. According to studies by the inventors, in order to improve the SNR of a magnetic recording medium having a thin magnetic layer, it is extremely effective to apply a magnetic powder that can make the anisotropic magnetic field distribution of the magnetic recording medium to fall within a range of 1.05 or less.

In the hexagonal strontium ferrite as disclosed in PTLs 2 and 3, the tabular ratio represented by the ratio (Dxa/Dxc) of the crystallite diameter Dxa in the a-axis direction and the crystallite diameter Dxc in the c-axis direction of the crystal lattice tends to be small, and the property (orientation) in which the c-axis is aligned in the direction perpendicular to the magnetic layer as much as possible is poor, and therefore, it is disadvantageous when a high reproduction output is intended to be exhibited by a magnetic recording medium having a particularly thin magnetic layer. On the other hand, hexagonal barium ferrite is advantageous in that magnetic particles having a large tabular ratio are easy to obtain. However, in hexagonal barium ferrite, no effective method for controlling the anisotropic magnetic field distribution of the magnetic recording medium within a predetermined range has been established. PTL 1 illustrates an Sr-containing hexagonal barium ferrite magnetic powder (Example 7), but it is synthesized by a production method of directly firing raw material mixed substances without going through an amorphous body, and therefore, the particle diameter is large (0.17 μm is shown in Example 7 in Table 2), and it cannot be applied to the use for recent high-density recording.

An object of the invention is to provide a hexagonal barium ferrite magnetic powder formed of fine particles, wherein the anisotropic magnetic field distribution of a magnetic recording medium having a thin magnetic layer can be made to fall within a range of 1.05 or less, which is effective in improving the SNR.

Solution to Problem

An anisotropic magnetic field Hk is a magnetic field necessary for completely reversing magnetization to the opposite direction. In order to improve the SNR of a magnetic recording medium, it is effective to reduce the number of magnetic particles that are easy to undergo magnetization reversal and lose records, and also to reduce the number of magnetic particles that do not contribute to recording without undergoing magnetization reversal. That is, it can be expected that the SNR is improved by improving the uniformity of magnetization reversal. The anisotropic magnetic field distribution, which represents a variation in the anisotropic magnetic field Hk, serves as an index for evaluating the uniformity of magnetization reversal. As the numerical value of the anisotropic magnetic field distribution is lower, the uniformity of magnetization reversal is evaluated as high. Therefore, it is expected that the SNR is improved by reducing the anisotropic magnetic field distribution of a magnetic recording medium. On the other hand, it is not always easy to reduce the anisotropic magnetic field distribution of a magnetic recording medium using a fine magnetic powder.

As a result of studies, the inventors found that in a hexagonal barium ferrite magnetic powder having a specific composition range containing a small amount of Sr as the element A, the anisotropic magnetic field distribution of a magnetic recording medium having a thin magnetic layer can be made to fall within a low range of 1.05 or less while refining the particles.

The above object is achieved by a magnetic powder for a magnetic recording medium, including magnetic particles in which Ba in hexagonal barium ferrite is partially substituted with Sr, wherein a Dx volume represented by the following formula (1) is 2,200 $nm^3$ or less, an Sr/(Ba+Sr) molar ratio is 0.01 to 0.30, and an anisotropic magnetic field distribution is 1.00 or less. In the magnetic powder, it is more preferred that a Dx ratio represented by the following formula (2) is 2.2 or more.

$$\text{Dx volume (nm}^3\text{)} = \text{Dxc} \times \pi \times (\text{Dxa}/2)^2 \quad (1)$$

$$\text{Dx ratio} = \text{Dxa}/\text{Dxc} \quad (2)$$

Here, Dxc is a crystallite diameter (nm) in a c-axis direction of a hexagonal ferrite crystal lattice, Dxa is a crystallite diameter (nm) in an a-axis direction of the same crystal lattice, and $\pi$ is a circular constant.

The magnetic powder may contain Bi such that a Bi/Fe molar ratio is within a range of 0.005 to 0.05.

Further, the invention provides a production method of the above-mentioned magnetic powder for a magnetic recording medium including:

- a step of obtaining an intermediate by holding an amorphous body containing Sr as a constituent element of hexagonal barium ferrite at a temperature of 500 to 570° C. for 10 hours or more, and
- a step of crystallizing the intermediate by heating within a temperature range of 600 to 670° C.

Advantageous Effects of Invention

When using the hexagonal barium ferrite magnetic powder formed of fine particles according to the invention, the anisotropic magnetic field distribution of a magnetic recording medium having a thin magnetic layer can be adjusted within a suitable range for achieving both improvement in the recording density and improvement in the SNR in a well-balanced manner.

BRIEF DESCRIPTION OF DRAWINGS

FIG. 1 is a graph showing a relationship between an Sr/(Sr+Ba) molar ratio and a powder Hk distribution of a hexagonal barium ferrite magnetic powder.

FIG. 2 is a graph showing a relationship between an Sr/(Sr+Ba) molar ratio and a Dx ratio of a hexagonal barium ferrite magnetic powder.

FIG. 3 is a graph showing a relationship between a powder Hk distribution of a hexagonal barium ferrite magnetic powder and a medium Hk distribution of a magnetic tape using the magnetic powder.

FIG. 4 is a graph showing a relationship between an Sr/(Sr+Ba) molar ratio of a hexagonal barium ferrite magnetic powder and a medium Hk distribution of a magnetic tape using the magnetic powder.

DESCRIPTION OF EMBODIMENTS

In the invention, as described above, by a hexagonal barium ferrite magnetic powder in which the anisotropic magnetic field distribution of the powder is defined within a predetermined range, an effect of making the anisotropic magnetic field distribution of a magnetic recording medium using the magnetic powder as a magnetic material to fall within a predetermined range is achieved.

Hereinafter, in the present specification, the anisotropic magnetic field distribution of a powder is referred to as "powder Hk distribution", and the anisotropic magnetic field distribution of a magnetic recording medium is referred to as "medium Hk distribution".

Hereinafter, matters specifying the invention will be described.

[Dx Volume]

In order to improve the recording density of a magnetic recording medium, it is advantageous that hexagonal ferrite crystal grains are fine. As a size parameter of crystal grains, a Dx volume obtained from a crystallite diameter can be adopted. The Dx volume is calculated according to the following formula (1).

$$\text{Dx volume (nm}^3\text{)} = \text{Dxc} \times \pi \times (\text{Dxa}/2)^2 \quad (1)$$

Here, Dxc is a crystallite diameter (nm) in a c-axis direction of a hexagonal ferrite crystal lattice, Dxa is a crystallite diameter (nm) in an a-axis direction of the same crystal lattice, and $\pi$ is a circular constant. The crystallite diameter can be obtained from the half width of a diffraction peak measured by X-ray diffractometry (XRD) using a Cu-K$\alpha$ ray as shown in Examples below.

According to studies by the inventors, in order to obtain a magnetic recording medium having a sufficiently high recording density, it is desirable to use a hexagonal barium ferrite magnetic powder having a Dx volume of 2,200 $nm^3$ or less. The Dx volume is more preferably 2,000 $nm^3$ or less. In an application where great importance is attached in particular to the improvement in the recording density, it is advantageous that the Dx volume is adjusted to 1,800 $nm^3$ or less, and it can also be adjusted to 1,750 $nm^3$ or less. On the other hand, when the Dx volume is adjusted within a relatively high range, a decreasing tendency is observed in the powder Hk distribution. A recording medium having a small medium Hk distribution is more likely to be obtained with the reduction in the powder Hk distribution. Therefore, in an application where great importance is attached in particular to the reduction in the medium Hk distribution, that is, the improvement in the SNR of the magnetic recording medium, it is advantageous that the Dx volume is adjusted, for example, within a range greater than 1,800 $nm^3$ and 2,200 $nm^3$ or less, and it may be adjusted within a range greater than 1,800 $nm^3$ and 2,000 $nm^3$ or less. The Dx volume can be controlled by a firing temperature for crystallization or heat history before firing in a process for synthesizing a hexagonal ferrite crystal through a process for amorphizing the melt of the raw material substances. In order to significantly reduce the Dx volume, it is necessary to considerably lower the firing temperature, and in that case, there is a concern that the magnetic properties may deteriorate due to the deterioration of the crystallinity. Normally, the Dx volume may be adjusted within a range of 1,100 $nm^3$ or more, and may be controlled to 1,300 $nm^3$ or more.

[Powder Hk Distribution]

The powder Hk distribution (the anisotropic magnetic field distribution of a magnetic powder) has some correlation with the medium Hk distribution of a magnetic recording medium using the powder. In an Sr-containing hexagonal barium ferrite magnetic powder in which the Dx volume is reduced as described above, the medium Hk distribution of a magnetic recording medium having a thin magnetic layer can be made to fall within a range of 1.05 or less, which is effective in improving the SNR, by setting the powder Hk distribution to 1.00 or less. The powder Hk distribution is more preferably 0.98 or less, and may be controlled to 0.93 or less. The powder Hk distribution can be controlled by adjustment of the Sr content or the Dx volume, or the like. It should be noted that, in order to achieve a very low powder Hk distribution in a refined hexagonal barium ferrite magnetic powder, it is likely to be accompanied by difficulties in production. Normally, the powder Hk distribution may be set within a range of 0.60 or more, and may be controlled within a range of 0.70 or more, or 0.75 or more. When using a hexagonal barium ferrite magnetic powder having a powder Hk distribution of, for example, 0.75 to 1.00, the medium Hk distribution of a magnetic recording medium having a thin magnetic layer can be made to fall within a range of 0.75 to 1.05.

[Dx Ratio]

The Dx ratio is a "tabular ratio" of a hexagonal ferrite particle, but here, it is not an average tabular ratio based on the particle shape ascertained by electron microscopic observation, but one based on a crystallite diameter measured by X-ray diffraction is adopted. That is, the Dx ratio is represented by the following formula (2).

$$\text{Dx ratio}=\text{Dxa}/\text{Dxc} \quad (2)$$

Here, Dxc is a crystallite diameter (nm) in a c-axis direction of a hexagonal ferrite crystal lattice, and Dxa is a crystallite diameter (nm) in an a-axis direction of the same crystal lattice.

As the Dx ratio is larger, the orientation in a magnetic recording medium having a particularly thin magnetic layer is better, which is advantageous in improving the magnetic properties. In the invention, the Dx ratio is preferably, for example, 2.2 or more, and more preferably 2.5 or more. The upper limit of the Dx ratio may be usually set within a range of 2.9 or less. The Dx ratio can be controlled by a firing temperature for crystallization, heat history before firing, or the like.

[Composition]

The inventors found that by partially substituting Ba in hexagonal barium ferrite with a small amount of Sr, an effect of lowering the powder Hk distribution is brought about. By utilizing this effect, it becomes possible to adjust the powder Hk distribution of the refined hexagonal barium ferrite magnetic powder within the range of 0.75 to 1.00 described above. Specifically, it is effective to set the Sr/(Ba+Sr) molar ratio within a range of 0.01 to 0.30, and it is more effective to set the ratio within a range of 0.03 to 0.20. The "Sr/(Ba+Sr) molar ratio" means the ratio of the number of moles of Sr to the total number of moles of Ba and Sr that form hexagonal ferrite.

As for the Fe site of hexagonal barium ferrite, part of Fe may be substituted with one or more divalent, tetravalent, or pentavalent metal elements. Examples of the divalent metal element include Co and Zn, examples of the tetravalent metal element include Ti and Sn, and examples of the pentavalent metal element include Nb and V. As for the Fe site substituting element, it is preferred to set the [total content of Fe site substituting element (mol)]/[Fe content (mol)] to 0.001 to 0.060.

The hexagonal barium ferrite magnetic powder targeted by the invention may contain Bi. Bi is not an element that forms the crystal structure of hexagonal ferrite (an element that enters any of the atomic sites of the chemical formula $AO\cdot 6Fe_2O_3$), but is an effective additive element for refining hexagonal ferrite crystal grains and improving the electromagnetic conversion characteristics of a magnetic recording medium using the magnetic powder. In particular, it has the effect of reducing the deterioration of the magnetic properties even when aiming at refinement of the crystal grains by lowering the firing temperature. When Bi is contained, it is effective to set the Bi/Fe molar ratio within a range of 0.005 to 0.05.

Moreover, one or more rare earth elements such as Nd, Y, Sm, Er, and Ho, or Al may be contained according to required properties. These elements also do not form the crystal structure of hexagonal ferrite. In the case where one or more rare earth elements are contained, when the rare earth element is represented by R, it is preferred to set the R/Fe molar ratio to 0.001 to 0.010. When Al is contained, it is preferred to set the Al/Fe molar ratio to 0.001 to 0.050.

[Production Method]

As a production method of a hexagonal barium ferrite magnetic powder, from the viewpoint of obtaining a hexagonal ferrite magnetic powder having a uniform grain size distribution with a small crystal grain size, it is preferred to apply a process going through an amorphous body obtained by quenching the melt of the raw material substances. Examples of the process include the following two patterns.

(Pattern 1)

A pattern in which the above-mentioned amorphous body is crystallized by firing. This is a so-called "glass crystallization method", and a conventionally known method can be used. Specifically, a step of crystallizing an amorphous body containing Sr as a constituent element of hexagonal barium ferrite by heating within a temperature range of 600 to 670° C. can be applied.

(Pattern 2)

A pattern in which the above-mentioned amorphous body is subjected to a preliminary heat treatment and thereafter crystallized by firing. This is a new method disclosed in the present specification. Specifically, a process including a step of obtaining an intermediate by holding an amorphous body containing Sr as a constituent element of hexagonal barium ferrite at a temperature of 500 to 570° C. for 10 hours or more, and a step of crystallizing the intermediate by heating within a temperature range of 600 to 670° C. can be applied. In the preliminary heat treatment for obtaining the intermediate, it is considered that most of the divalent Fe contained in the amorphous body obtained by quenching is oxidized to trivalent Fe. It is considered that by using the intermediate in a state where trivalent Fe is formed in advance, the reaction for allowing oxidation of divalent Fe to trivalent Fe to proceed during firing can be greatly reduced. As a result, a hexagonal barium ferrite magnetic powder having an improved magnetocrystalline anisotropy constant Ku can be synthesized. That is, this "pattern 2" is an effective method for obtaining a hexagonal barium ferrite magnetic powder having high thermal stability.

[Evaluation Method for Anisotropic Magnetic Field Distribution (Powder Hk Distribution, Medium Hk Distribution)]

The anisotropic magnetic field distributions of a powder and a magnetic recording medium can be obtained by the following procedure through a remanence method using a vibrating sample magnetometer (VSM). The measurement is performed at a sample temperature of 23° C. By setting the ambient temperature around a sample to 23° C., the sample temperature can be set to 23° C. by establishing temperature equilibrium.

First, an external magnetic field Hm is applied in an arbitrary direction (referred to as x direction) to saturate the magnetization of the sample, and then, the applied magnetic field is set to zero, and the residual magnetization in a direction different by 90° from the x direction (referred to as y direction) is measured. The external magnetic field Hm applied above may be any value as long as it can saturate the magnetization of the sample.

Thereafter, an external magnetic field H1 is applied at an angle different by 15° from the x direction, and then, the applied magnetic field is set to zero and the residual magnetization in the y direction is measured. Here, H1 is smaller than Hm.

Thereafter, an external magnetic field H2 is applied at an angle different by 15° from the x direction, and then, the applied magnetic field is set to zero and the residual magnetization in the y direction is measured. Here, H2 is larger than H1.

Thereafter, an external magnetic field H3 is applied at an angle different by 15° from the x direction, and then, the applied magnetic field is set to zero and the residual magnetization in the y direction is measured. Here, H3 is larger than H2.

As described above, the residual magnetization in the y direction is sequentially measured by changing the applied magnetic field in the x direction in the order of H1→0→H2→0→H3→0 . . . . The magnetic field applied in the x direction for each measurement is larger than the magnetic field applied for the immediately preceding measurement. The magnetic field applied in the x direction for the final measurement can be arbitrarily set.

The residual magnetization in the y direction measured as described above is plotted on a graph (vertical axis: the magnitude of the residual magnetization in the y direction, horizontal axis: the magnitude of the applied magnetic field in the x direction). This plot is differentiated, and a value on the horizontal axis at the peak position of the obtained differential curve is defined as the anisotropic magnetic field Hk. The anisotropic magnetic field distribution is calculated as a value of [the half width of the approximate curve described above]/[the anisotropic magnetic field Hk].

EXAMPLES

Example 1

(Production of Hexagonal Barium Ferrite Magnetic Powder)

Boric acid $H_3BO_3$ (for industrial use), barium carbonate $BaCO_3$ (for industrial use), strontium carbonate $SrCO_3$ (for industrial use), iron oxide $Fe_2O_3$ (for industrial use), cobalt oxide CoO (reagent, purity: 90% or more), titanium oxide $TiO_2$ (reagent first grade), bismuth oxide $Bi_2O_3$ (for industrial use), neodymium oxide $Nd_2O_3$ (for industrial use), and aluminum hydroxide $Al(OH)_3$ (reagent, purity: 99.0% or more) were weighed to obtain a raw material composition shown in Table 1, and mixed using an FM mixer manufactured by Mitsui Miike Machinery Co., Ltd., thereby obtaining a raw material mixture. The raw material mixture was placed in a pelletizer and granulated by forming into a spherical shape while spraying water, and then dried at 270° C. for 14 hours, thereby obtaining a granulated product with a particle diameter of 1 to 50 mm.

The granulated product was melted in a melting furnace using a platinum crucible. After raising the temperature to 1400° C. and holding the product for 60 minutes while stirring, each raw material substance was brought to a completely molten state, and then, the molten material was discharged from a nozzle and quenched by a gas atomization method, thereby obtaining an amorphous body.

The obtained amorphous body was crystallized by applying the process (pattern 2 described above) of sequentially performing the following heat treatments. This process is an effective method for synthesizing hexagonal barium ferrite having high thermal stability.

<Preliminary Heat Treatment>

An intermediate was obtained by heating and holding the above amorphous body in air at 530° C. for 72 hours.

<Crystallization Heat Treatment>

The obtained intermediate was crystallized by heating and holding in air at 630° C. for 60 minutes.

The powder obtained by the crystallization heat treatment contains a residual substance mainly containing barium borate other than hexagonal ferrite. In order to remove the residual substance, acid washing was performed such that the powder obtained by the crystallization heat treatment was immersed in a 10 mass % aqueous acetic acid solution heated to 60° C. and held for 1 hour with stirring to dissolve the residual substance in the solution, and thereafter, solid-liquid separation was performed by filtration, and pure water was added for washing. Pure water was added to the obtained solid material, and the resultant was stirred and wet pulverized with a star mill.

An aqueous aluminum chloride solution was added to the slurry containing the solid material after wet pulverization. The addition amount of Al due to aluminum chloride was 3.3 parts by mass in terms of $Al(OH)_3$ with respect to 100 parts by mass of the solid material. The slurry after adding the aqueous aluminum chloride solution was stirred at 40° C. for 10 minutes. The pH of this slurry was within a range of 3.0 to 4.0. Thereafter, sodium hydroxide was added to adjust the pH to 8.0 to 9.0, and the resultant was further stirred at 40° C. for 10 minutes, thereby forming a layer of aluminum hydroxide, which is a reaction product, on the surfaces of particles of the solid material (hexagonal ferrite magnetic particles). Thereafter, solid-liquid separation was performed by filtration, pure water was added thereto, and washing with water was performed until the electrical conductivity of the liquid after washing (filtrate) became 10 μS/cm or less. After washing with water, the resultant was dried in air at 110° C. for 12 hours. Thus, a dry powder in which aluminum hydroxide was coated on the surfaces of the hexagonal barium ferrite particles was obtained. This aluminum hydroxide contributes to improvement in the durability of a magnetic recording medium.

As a finish pulverization step, the obtained dry powder was put into an impact mill (Fine Impact Mill AVIS-150, manufactured by Millsystem Co., Ltd.) at a feed rate of 150 g/min, and pulverized at a rotational speed of 9750 rpm with a distance of 1 mm between the pin tip of the rotor of the impact mill and the base of the stator. The pulverization conditions were set within the range of appropriate conditions obtained by a preliminary experiment. The hexagonal barium ferrite magnetic powder having undergone the finish pulverization step was used as a test powder in the following studies. The main items of the magnetic powder production conditions are shown in Table 1.

(Composition Analysis of Magnetic Powder)

The composition of the test powder was analyzed using a high-frequency inductively coupled plasma atomic emission spectrometer ICP (720-ES) manufactured by Agilent Technologies, Inc. The analysis was performed by setting the measurement wavelength (nm) as follows: Fe: 259.940 nm, Ba: 233.527 nm, Sr: 421.552 nm, Co: 231.160 nm, Ti: 334.941 nm, Bi: 222.821 nm, Nd: 406.108 nm, and Al: 396.152 nm. The measurement wavelength of each metal element was selected according to the composition of the magnetic powder to be analyzed so that there is no spectral interference with other elements and the linearity of the calibration curve can be obtained. From the obtained quantitative values, the molar ratio of each element to Fe was calculated. The X/Fe molar ratio for a certain element X (X is, for example, Co, Al, or the like) is calculated according to the following formula.

X/Fe molar ratio=X content (mol %)/Fe content (mol %)

The content of Ba was indicated by a Ba/Fe site element molar ratio calculated according to the following formula.

Ba/Fe site element molar ratio=Ba content (mol %)/total content of Fe and transition metal elements partially substituting Fe sites (mol %)

In this example, the transition metal elements partially substituting Fe sites are only Co and Ti, and therefore, the formula becomes as follows: Ba/Fe site element molar ratio=Ba content (mol %)/(Fe content (mol %)+Co content (mol %)+Ti content (mol %)).

The content of Sr was indicated by an Sr/(Sr+Ba) molar ratio. The Sr/(Sr+Ba) molar ratio of the test powder of this example was 0.041.

(Measurement of Powder Magnetic Properties)

The test powder was packed in a p 6 mm plastic container, and by using a vibrating sample magnetometer (VSM-P7-15, manufactured by Toei Industry Co., Ltd.), a coercive force Hc, a saturation magnetization as, and a squareness ratio SQ were measured under the following conditions: external magnetic field: 795.8 kA/m (10 kOe), M measurement range: 0.010 A·m$^2$ (10 emu), step bit: 198 (bit), time constant: 0.03 sec, and wait time 0.1 sec.

(Measurement of BET Specific Surface Area)

With respect to the test powder, a specific surface area was obtained by a BET single point method using a full automatic specific surface area analyzer (Macsorb HM Model-1210, manufactured by Mountech Co., Ltd.).

(Evaluation of Activation Volume Vact and Magnetocrystalline Anisotropy Constant Ku)

A pulse magnetic field generator (TP15326, manufactured by TESLA) and a vibrating sample magnetometer (VSM-5, manufactured by Toei Industry Co., Ltd.) were used. An activation volume Vact and a magnetocrystalline anisotropy constant Ku were evaluated by the following operations (1) to (10). However, the operations (2) to (10) were performed at 25±1° C. The amount of residual magnetization was measured by setting the M measurement range to 0.005 A·m$^2$ (5 emu) and the time constant to 0.03 sec.

(1) The hexagonal barium ferrite magnetic powder to be tested was packed in a φ6 mm plastic container.

(2) A magnetic field of 1034.54 kA/m (13 kOe) was applied by a vibrating sample magnetometer to saturate the magnetization, and the magnetic field was returned to zero. At this time, the step bit was set to 240 bits, the wait time was set to 0.8 sec, and the magnetic field was applied in the return mode.

(3) The sample was detached from the vibrating sample magnetometer and attached to a pulse magnetic field generator. At this time, the sample was attached so that a magnetic field (referred to as a reverse magnetic field) was applied in a direction opposite to the direction of saturation magnetization.

(4) A magnetic field was applied for a reverse magnetic field application time of 0.40 ms, and the magnetic field was returned to zero. The applied magnetic field is Hc+23.88 kA/m as a standard in the first time. In the second time and thereafter, a reverse magnetic field different from that in the first time is set with reference to the result in the first time so that the residual magnetization is close to zero.

(5) The sample was detached from the pulse magnetic field generator and attached to the vibrating sample magnetometer so that the direction of the sample is the same as in (2).

(6) The amount of residual magnetization was measured with the vibrating sample magnetometer. The operation from the end of the operation (2) to the measurement of the residual magnetization was performed in 20 seconds.

(7) The value of the reverse magnetic field applied in (4) was changed, and the operations (2) to (6) were further repeated four times or more.

(8) Five or more measurement results were selected and linearly approximated so as to obtain the reverse magnetic field value Hr (0.40 ms) at which the residual magnetization is 0 Am$^2$/kg by interpolation, and the operations (2) to (7) were repeated until the value of the coefficient of determination $R^2$ reached 0.990 or more. From this approximate straight line, the reverse magnetic field value Hr (0.40 ms) when the residual magnetization is 0 Am$^2$/kg was obtained. This Hr is called a residual coercive force. The value of the reverse magnetic field to be applied can be appropriately set according to the Hr value of the magnetic body.

(9) The reverse magnetic field application time was set to 6.1 ms, and the same operations as (2) to (8) were performed, and then, a residual coercive force Hr (6.1 ms) when the residual magnetization was 0 Am$^2$/kg was obtained.

(10) The reverse magnetic field application time was changed to 17 s and the apparatus for applying a magnetic field was changed to a vibrating sample magnetometer, and the same operations as (2) to (8) were performed, and then, a residual coercive force Hr (17 s) when the residual magnetization was 0 Am$^2$/kg was obtained. At this time, the operations of attaching and detaching the sample in (3) to (5) were not performed. In addition, the number of repetitions in (7) was set to 2 or more, and in (8), three measurement results were selected and linearly approximated, and the value of determination coefficient $R^2$ was set to 0.997 or more.

Hr (0.40 ms), Hr (6.1 ms), and Hr (17 s) were analyzed using data analysis software (Origin, manufactured by OriginLab Corporation). The Curve Fit (non-linear) function was used, $H_0$ and KuV/kT in the following formula (3) were used as the fitting parameters, and optimization was performed by the least squares method, thereby obtaining the values of $H_0$ and KuV/kT. At this time, 5000 and 50 were input as the initial values of $H_0$ and KuV/kT, respectively. The activation volume Vact was calculated by substituting $H_0$ and KuV/kT obtained by the least squares method into the following formula (4). Further, the magnetocrystalline anisotropy constant Ku was calculated by substituting $H_0$ into the following formula (5).

$$Hr(t)=H_0\{1-[(\mathrm{kT/KuV})\ln(f_0 t/\ln 2)]^{0.77}\} \quad (3)$$

Here, k is a Boltzmann constant (J/K), T is a measurement temperature (K), Ku is a magnetocrystalline anisotropy constant (J/m$^3$), V=Vact is an activation volume (nm$^3$), Hr(t) is a residual coercive force (kA/m) at a reverse magnetic field application time t, $H_0$ is a residual coercive force (kA/m) in $10^{-9}$ seconds, $f_0$ is a spin precession frequency ($s^{-1}$), and t is a reverse magnetic field application time (s). The value of $f_0$ is $10^9$ ($s^{-1}$) here.

$$\mathrm{Vact\ (nm^3)}=1.249\times10^4\times\mathrm{KuV/kT}/H_0 \quad (4)$$

$$\mathrm{Ku\ (J/m^3)}=331\times H_0\ \mathrm{(kA/m)} \quad (5)$$

Here, the coefficient $1.249\times10^4$ in the formula (4) and the coefficient 331 in the formula (5) are sums of individual numerical values and unit conversion coefficients in the calculation process.

When the unit of the Ku value calculated according to the above formula (5) was converted to MJ/m$^3$, the magnetocrystalline anisotropy constant Ku of the test powder of this example was obtained as 0.139 MJ/m$^3$.

(Evaluation of Dx Volume and Dx Ratio)

By an X-ray diffractometer (Ultima IV, manufactured by Rigaku Corporation) using a Cu tube, the crystallite diameter Dxc (nm) in the c-axis direction and the crystallite diameter Dxa (am) in the a-axis direction of the hexagonal ferrite crystal lattice were obtained according to the following formula (6).

$$\text{Crystallite diameter (nm)}=K\lambda/(\beta\cdot\cos\theta) \quad (6)$$

Here, K is a Scherrer constant 0.9, λ is a Cu-Kα ray wavelength (nm), β is a half width (radian) of a diffraction peak of a hexagonal crystal (006) plane in the measurement of Dxc, and a half width (radian) of a diffraction peak of a hexagonal crystal (220) plane in the measurement of Dxa, and θ is a Bragg angle of a diffraction peak (½ of diffraction angle 2θ) (radian).

Dxc was measured by scanning a 2θ range from 20.5 to 25°, and Dxa was measured by scanning a 26 range from 60 to 65°. The measurement method was a continuous measurement method of a concentration method, and a one-dimensional semiconductor detector (D-tex) was used as the detector. The measurement was performed with a divergence slit of ½°, a scattering slit of 8 mm, and a receiving slit open. The sampling interval was set as follows: Dxc: 0.05°, Dxa: 0.02°, the scanning speed was set as follows: Dxc: 0.1°/min, Dxa: 0.4°/min, and the integration frequency was set to once.

The Dx volume and the Dx ratio (tabular ratio) were each calculated by substituting the measured values of Dxc (nm) and Dxa (nm) into the following formula (1) and formula (7).

$$\text{Dx volume (nm}^3\text{)}=\text{Dxc}\times\pi\times(\text{Dxa}/2)^2 \quad (1)$$

$$\text{Dx ratio}=\text{Dxa}/\text{Dxc} \quad (7)$$

Here, π is a circular constant.

(Evaluation of Powder Hk Distribution)

The test powder was packed in a φ 6 mm plastic container, and a powder Hk distribution was obtained according to the above-mentioned "Evaluation Method for Anisotropic Magnetic Field Distribution (Powder Hk Distribution, Medium Hk Distribution)" using TM-VSM 6050-SM model manufactured by Tamagawa Seisakusyo as a VSM. Hm was set to 20,000 Oe, H1 was set to 1,000 Oe, and the magnetic field applied in the x direction for each measurement was set to the magnetic field applied for the immediately preceding measurement+1,000 Oe, and the measurement was performed up to H13=13,000 Oe.

The powder Hk distribution of the test powder of this example was 0.95.

By using the above-mentioned test powder (hexagonal barium ferrite magnetic powder), a magnetic recording medium (magnetic tape) was produced as follows. "Parts" and "%" described with respect to the production of the magnetic tape mean "parts by mass" and "mass %", respectively, unless otherwise specified.

(Formulation of Magnetic Layer Coating Liquid)

<Magnetic Liquid>

- Hexagonal barium ferrite magnetic powder particles: 100.0 parts
- Oleic acid: 1.5 parts
- Vinyl chloride copolymer (MR-104, manufactured by Zeon Corporation): 8.0 parts
- $SO_3Na$ group-containing polyurethane resin (weight average molecular weight: 70,000, $SO_3Na$ group: 0.07 meq/g): 2.0 parts
- Amine-based polymer (DISPERBYK-102 manufactured by BYK-Chemie GmbH): 7.0 parts
- Methyl ethyl ketone: 150.0 parts
- Cyclohexanone: 150.0 parts <Abrasive Liquid>

- α-alumina (specific surface area: 19 $m^2$/g, sphericity: 1.4): 6.0 parts
- $SO_3Na$ group-containing polyurethane resin (weight average molecular weight: 70,000, $SO_3Na$ group: 0.1 meq/g): 0.6 parts
- 2,3-dihydroxynaphthalene: 0.6 parts
- Cyclohexanone: 23.0 parts <Non-Magnetic Filler Liquid>

- Colloidal silica (average particle size: 80 nm, coefficient of variation=7%, sphericity: 1.03): 2.0 parts
- Methyl ethyl ketone: 8.0 parts <Lubricant/Curing Agent Liquid>

- Stearic acid: 3.0 parts
- Stearic acid amide: 0.3 parts
- Butyl stearate: 6.0 parts
- Methyl ethyl ketone: 110.0 parts
- Cyclohexanone: 110.0 parts
- Polyisocyanate (Coronate (registered trademark) L, manufactured by Nippon Polyurethane Industry Co., Ltd.): 3 parts (Formulation of Non-Magnetic Layer Coating Liquid)

- Non-magnetic powder α-iron oxide (average major axis length: 10 nm, average acicular ratio: 1.9, BET specific surface area: 75 $m^2$/g): 100 parts
- Carbon black (average particle diameter: 20 nm): 25 parts
- $SO_3Na$ group-containing polyurethane resin (average molecular weight: 70,000, $SO_3Na$ group content: 0.2 meq/g): 18 parts
- Stearic acid: 1 part
- Cyclohexanone: 300 parts
- Methyl ethyl ketone: 300 parts (Formulation of Backcoat Layer Coating Liquid)

- Non-magnetic inorganic powder: α-iron oxide (average major axis length: 0.15 μm, average acicular ratio: 7, BET specific surface area: 52 $m^2$/g): 80 parts
- Carbon black (average particle diameter: 20 nm): 20 parts
- Vinyl chloride copolymer: 13 parts
- Sulfonate base-containing polyurethane resin: 6 parts
- Phenylphosphonic acid: 3 parts
- Cyclohexanone: 155 parts
- Methyl ethyl ketone: 155 parts
- Stearic acid: 3 parts
- Butyl stearate: 3 parts
- Polyisocyanate: 5 parts
- Cyclohexanone: 200 parts (Production of Magnetic Tape)

The magnetic layer coating liquid was prepared by dispersing each substance according to the formulation of the magnetic layer coating liquid described above for 24 hours using 0.1 mm p zirconia beads in a batch-type vertical sand mill (bead dispersion), followed by filtration using a filter having an average pore diameter of 0.5 μm.

The non-magnetic layer coating liquid was prepared by dispersing each substance according to the formulation of the non-magnetic layer coating liquid described above for 24 hours using 0.1 mm φ zirconia beads in a batch-type vertical sand mill (bead dispersion), followed by filtration using a filter having an average pore diameter of 0.5 μm.

The backcoat layer coating liquid was prepared by kneading and diluting each substance excluding the lubricants (stearic acid and butyl stearate), polyisocyanate, and 200 parts of cyclohexanone from the substances shown in the formulation of the backcoat layer coating liquid described above using an open-type kneader, and thereafter subjecting the resultant to 12 passes of dispersion treatment in a horizontal bead mill dispersing machine using 1 mm φ zirconia beads by setting the bead filling rate to 80%, the rotor tip peripheral speed to 10 m/s, and the residence time per pass to 2 minutes, and then, adding the rest of the substances and stirring with a dissolver, and filtering the obtained dispersion liquid using a filter having an average pore diameter of 1 μm.

The non-magnetic layer coating liquid prepared above was applied onto the surface of a polyethylene naphthalate support having a thickness of 5 μm (Young's modulus in transverse direction: 8 GPa, Young's modulus in longitudinal direction: 6 GPa) so that the thickness after drying would be 100 nm, followed by drying, and then, the magnetic layer coating liquid prepared above was applied thereon so that the thickness after drying would be 70 nm. While this magnetic layer coating liquid was in an undried state, a vertical alignment treatment in which a magnetic field having a magnetic field strength of 0.3 T is applied in a direction perpendicular to the coating surface was performed, and then, the resultant was dried. Thereafter, the backcoat layer coating liquid prepared above was applied to the surface on the opposite side of the support so that the thickness after drying would be 0.4 μm, followed by drying. The resulting tape was subjected to a surface smoothing treatment by a calender formed only of a metal roll at a speed of 100 m/min, a linear pressure of 300 kg/cm, and a temperature of 100° C., and then subjected to a heat treatment for 36 hours in a dry environment at 70° C. After the heat treatment, the resultant was slit to a width of ½ inch, thereby obtaining a magnetic tape.

(Evaluation of Medium Hk Distribution)

A sample with a length of 3 cm was cut from the obtained magnetic tape, and for this sample, a medium Hk distribution was obtained according to the above-mentioned "Evaluation Method for Anisotropic Magnetic Field Distribution (Powder Hk Distribution, Medium Hk Distribution)" using TM-VSM 6050-SM model manufactured by Tamagawa Seisakusyo as a VSM. The "x direction" was set as the longitudinal direction of the magnetic recording medium, the "y direction" was set as the thickness direction, Hm was set to 20,000 Oe, H1 was set to 1,000 Oe, and the magnetic field applied in the x direction for each measurement was set to the magnetic field applied for the immediately preceding measurement 1,000 Oe, and the measurement was performed up to H13=13,000 Oe.

The test powder of this example had an Sr/(Sr+Ba) molar ratio of 0.041, and the powder Hk distribution was 0.95. The medium Hk distribution of the magnetic tape using the test powder was 1.00. The results are shown in Table 1.

Example 2

A hexagonal barium ferrite magnetic powder having an Sr/(Sr+Ba) molar ratio of 0.059 and a powder Hk distribution of 0.90 was produced in the same manner as in Example 1 according to the raw material composition and the production conditions shown in Table 1. A magnetic tape was produced under the same conditions as in Example 1 except that this powder was used as the test powder, and the magnetic properties were examined. As a result, the medium Hk distribution was 0.96. The results are shown in Table 1.

Example 3

A hexagonal barium ferrite magnetic powder having an Sr/(Sr+Ba) molar ratio of 0.083 and a powder Hk distribution of 0.87 was produced in the same manner as in Example 1 according to the raw material composition and the production conditions shown in Table 1. A magnetic tape was produced under the same conditions as in Example 1 except that this powder was used as the test powder, and the magnetic properties were examined. As a result, the medium Hk distribution was 0.92. The results are shown in Table 1.

Example 4

A hexagonal barium ferrite magnetic powder having an Sr/(Sr+Ba) molar ratio of 0.093 and a powder Hk distribution of 0.84 was produced in the same manner as in Example 1 according to the raw material composition and the production conditions shown in Table 1. A magnetic tape was produced under the same conditions as in Example 1 except that this powder was used as the test powder, and the magnetic properties were examined. As a result, the medium Hk distribution was 0.88. The results are shown in Table 1.

Example 5

A hexagonal barium ferrite magnetic powder having an Sr/(Sr+Ba) molar ratio of 0.132 and a powder Hk distribution of 0.81 was produced in the same manner as in Example 1 according to the raw material composition and the production conditions shown in Table 1. A magnetic tape was produced under the same conditions as in Example 1 except that this powder was used as the test powder, and the magnetic properties were examined. As a result, the medium Hk distribution was 0.82. The results are shown in Table 1.

Example 6

A hexagonal barium ferrite magnetic powder having an Sr/(Sr+Ba) molar ratio of 0.260 and a powder Hk distribution of 0.85 was produced in the same manner as in Example 1 according to the raw material composition and the production conditions shown in Table 1. A magnetic tape was produced under the same conditions as in Example 1 except that this powder was used as the test powder, and the magnetic properties were examined. As a result, the medium Hk distribution was 0.81. The results are shown in Table 1.

Comparative Example 1

A hexagonal barium ferrite magnetic powder was produced without adding Sr by the above-mentioned production method of pattern 1 (conventional process), in which the preliminary heat treatment is not performed, according to the raw material composition and the production conditions shown in Table 1. A small amount of Sr was detected as an unavoidable impurity in the analysis, and the Sr/(Sr+Ba) molar ratio was 0.002. The hexagonal barium ferrite magnetic powder was produced in the same manner as in Example 1 except that the process of pattern 2 was changed to pattern 1. The powder Hk distribution of this magnetic powder was 1.04. A magnetic tape was produced under the same conditions as in Example 1 using this magnetic powder as the test powder, and the magnetic properties were examined. As a result, the medium Hk distribution was as high as 1.15. The results are shown in Table 1.

In the following Examples 7 to 9, examples in which the Dx volume was adjusted within a range greater than 1,800 $nm^3$ and 2,000 $nm^3$ or less are disclosed.

Example 7

A hexagonal barium ferrite magnetic powder having an Sr/(Sr+Ba) molar ratio of 0.046 and a Dx volume of 1,860 nm$^3$ was produced in the same manner as in Example 1 according to the raw material composition and the production conditions shown in Table 2. A magnetic tape was produced under the same conditions as in Example 1 except that this powder was used as the test powder, and the magnetic properties were examined. As a result, the medium Hk distribution was 0.83. The results are shown in Table 2.

Example 8

A hexagonal barium ferrite magnetic powder having an Sr/(Sr+Ba) molar ratio of 0.092 and a Dx volume of 1,870 nm$^3$ was produced in the same manner as in Example 1 according to the raw material composition and the production conditions shown in Table 2. A magnetic tape was produced under the same conditions as in Example 1 except that this powder was used as the test powder, and the magnetic properties were examined. As a result, the medium Hk distribution was 0.81. The results are shown in Table 2.

Example 9

A hexagonal barium ferrite magnetic powder having an Sr/(Sr+Ba) molar ratio of 0.144 and a Dx volume of 1,955 nm$^3$ was produced in the same manner as in Example 1 according to the raw material composition and the production conditions shown in Table 2. A magnetic tape was produced under the same conditions as in Example 1 except that this powder was used as the test powder, and the magnetic properties were examined. As a result, the medium Hk distribution was 0.77. The results are shown in Table 2.

TABLE 1

| | | Example 1 | Example 2 | Example 3 | Example 4 | Example 5 | Example 6 | Comparative Example 1 |
|---|---|---|---|---|---|---|---|---|
| Raw material composition (g) | $Fe_2O_3$ | 934.4 | 939.7 | 945.0 | 950.3 | 955.7 | 978.0 | 925.9 |
| | $BaCO_3$ | 1432.8 | 1360.8 | 1287.9 | 1214.3 | 1139.8 | 833.1 | 1577.6 |
| | $SrCO_3$ | 119.1 | 179.7 | 240.9 | 302.9 | 365.5 | 623.4 | 0.0 |
| | $H_3BO_3$ | 774.8 | 779.1 | 783.5 | 787.9 | 792.4 | 810.9 | 760.6 |
| | CoO | 8.8 | 8.8 | 8.9 | 8.9 | 9.0 | 9.2 | 8.7 |
| | $TiO_2$ | 18.7 | 18.8 | 18.9 | 19.0 | 19.1 | 19.6 | 18.5 |
| | $Bi_2O_3$ | 108.0 | 108.6 | 109.2 | 109.8 | 110.5 | 113.0 | 107.0 |
| | $Nd_2O_3$ | 140.4 | 141.2 | 142.0 | 142.8 | 143.6 | 146.9 | 139.1 |
| | $Al(OH)_3$ | 63.0 | 63.4 | 63.7 | 64.1 | 64.4 | 65.9 | 62.4 |
| Preliminary heat treatment | Temperature (° C.) | 530 | 530 | 530 | 530 | 530 | 550 | — |
| | Time (h) | 72 | 72 | 72 | 72 | 72 | 72 | — |
| Crystallization heat treatment temperature (° C.) | | 630 | 626 | 630 | 628 | 630 | 640 | 618 |
| Acid washing | Temperature (° C.) | 60 | 60 | 60 | 60 | 60 | 60 | 60 |
| | Time (h) | 1 | 1 | 1 | 1 | 1 | 1 | 1 |
| | Acetic acid concentration (mass %) | 10 | 10 | 10 | 10 | 10 | 10 | 10 |
| Molar ratio in magnetic powder | Ba/(Fe + Co + Ti) | 0.075 | 0.073 | 0.069 | 0.069 | 0.066 | 0.056 | 0.075 |
| | Sr/(Ba + Sr) | 0.041 | 0.059 | 0.083 | 0.093 | 0.132 | 0.260 | 0.002 |
| | Co/Fe | 0.008 | 0.009 | 0.009 | 0.009 | 0.009 | 0.009 | 0.009 |
| | Ti/Fe | 0.020 | 0.020 | 0.020 | 0.021 | 0.021 | 0.019 | 0.020 |
| | Bi/Fe | 0.034 | 0.034 | 0.033 | 0.035 | 0.035 | 0.036 | 0.034 |
| | Nd/Fe | 0.004 | 0.004 | 0.004 | 0.004 | 0.004 | 0.009 | 0.004 |
| | Al/Fe | 0.047 | 0.047 | 0.044 | 0.045 | 0.047 | 0.041 | 0.041 |
| Magnetic powder properties | Hc (kA/m) | 173 | 177 | 185 | 185 | 204 | 224 | 148 |
| | σs ($Am^2/kg$) | 41 | 42 | 42 | 42 | 42 | 42 | 41 |
| | SQ | 0.51 | 0.51 | 0.52 | 0.52 | 0.53 | 0.53 | 0.50 |
| | BET ($m^2/g$) | 107 | 109 | 103 | 107 | 103 | 91 | 112 |
| | Vact ($nm^3$) | 1720 | 1750 | 1870 | 1780 | 1950 | 1950 | 1800 |
| | Ku ($MJ/m^3$) | 0.139 | 0.140 | 0.141 | 0.143 | 0.146 | 0.160 | 0.125 |
| | Powder Hk distribution | 0.95 | 0.90 | 0.87 | 0.84 | 0.81 | 0.85 | 1.04 |
| | Dx volume ($nm^3$) | 1575 | 1665 | 1575 | 1635 | 1705 | 1665 | 1557 |
| | Dx ratio | 2.7 | 2.7 | 2.7 | 2.7 | 2.6 | 2.3 | 2.9 |
| Medium Hk distribution | | 1.00 | 0.96 | 0.92 | 0.88 | 0.82 | 0.81 | 1.15 |

TABLE 2

| | | Example 7 | Example 8 | Example 9 |
|---|---|---|---|---|
| Raw material composition (g) | $Fe_2O_3$ | 934.4 | 945.0 | 955.7 |
| | $BaCO_3$ | 1432.8 | 1287.9 | 1139.8 |
| | $SrCO_3$ | 119.1 | 240.9 | 365.5 |
| | $H_3BO_3$ | 774.8 | 783.5 | 792.4 |
| | CoO | 8.8 | 8.9 | 9.0 |
| | $TiO_2$ | 18.7 | 18.9 | 19.1 |
| | $Bi_2O_3$ | 108.0 | 109.2 | 110.5 |
| | $Nd_2O_3$ | 140.4 | 142.0 | 143.6 |
| | $Al(OH)_3$ | 63.0 | 63.7 | 64.4 |
| Preliminary heat treatment | Temperature (° C.) | 530 | 530 | 530 |
| | Time (h) | 72 | 72 | 72 |
| Crystallization heat treatment temperature (° C.) | | 649 | 648 | 641 |

TABLE 2-continued

| | | Example 7 | Example 8 | Example 9 |
|---|---|---|---|---|
| Acid washing | Temperature (° C.) | 60 | 60 | 60 |
| | Time (h) | 1 | 1 | 1 |
| | Acetic acid concentration (mass %) | 10 | 10 | 10 |
| Molar ratio in magnetic powder | Ba/(Fe + Co + Ti) | 0.078 | 0.072 | 0.068 |
| | Sr/(Ba + Sr) | 0.046 | 0.092 | 0.144 |
| | Co/Fe | 0.010 | 0.009 | 0.009 |
| | Ti/Fe | 0.021 | 0.020 | 0.021 |
| | Bi/Fe | 0.036 | 0.035 | 0.037 |
| | Nd/Fe | 0.004 | 0.004 | 0.005 |
| | Al/Fe | 0.055 | 0.051 | 0.049 |
| Magnetic powder properties | Hc (kA/m) | 208 | 217 | 224 |
| | σs ($Am^2/kg$) | 42 | 42 | 43 |
| | SQ | 0.53 | 0.53 | 0.54 |
| | BET ($m^2/g$) | 98 | 95 | 95 |
| | Vact ($nm^3$) | 2010 | 1990 | 2070 |
| | Ku ($MJ/m^3$) | 0.146 | 0.151 | 0.152 |
| | Powder Hk distribution | 0.79 | 0.77 | 0.76 |
| | Dx volume ($nm^3$) | 1860 | 1870 | 1955 |
| | Dx ratio | 2.7 | 2.5 | 2.6 |
| Medium Hk distribution | | 0.83 | 0.81 | 0.77 |

FIG. 1 shows the relationship between the Sr/(Sr+Ba) molar ratio and the powder Hk distribution of the hexagonal barium ferrite magnetic powder in each example. The open square plots are examples of Examples 7 to 9 in which the Dx volume is greater than 1,800 $nm^3$ and 2,000 $nm^3$ or less.

FIG. 2 shows the relationship between the Sr/(Sr+Ba) molar ratio and the Dx ratio of the hexagonal barium ferrite magnetic powder in each example. The open square plots are examples of Examples 7 to 9 in which the Dx volume is greater than 1,800 $nm^3$ and 2,000 $nm^3$ or less.

FIG. 3 shows the relationship between the powder Hk distribution of the hexagonal barium ferrite magnetic powder and the medium Hk distribution of the magnetic tape using the magnetic powder in each example. The open square plots are examples of Examples 7 to 9 in which the Dx volume is greater than 1,800 $nm^3$ and 2,000 $nm^3$ or less.

FIG. 4 shows the relationship between the Sr/(Sr+Sa) molar ratio of the hexagonal barium ferrite magnetic powder and the medium Hk distribution of the magnetic tape using the magnetic powder in each example. The open square plots are examples of Examples 7 to 9 in which the Dx volume is greater than 1,800 $nm^3$ and 2,000 $nm^3$ or less.

The invention claimed is:

1. A magnetic powder for a magnetic recording medium, comprising magnetic particles in which Ba in hexagonal barium ferrite is partially substituted with Sr, wherein a Dx volume represented by the following formula (1) is 2,200 $nm^3$ or less, an Sr/(Ba+Sr) molar ratio is 0.01 to 0.30, and an anisotropic magnetic field distribution is 1.00 or less:

$$\text{Dx volume } (nm^3)=\text{Dxc}\times\pi\times(\text{Dxa}/2)^2 \quad (1)$$

wherein Dxc is a crystallite diameter (nm) in a c-axis direction of a hexagonal ferrite crystal lattice, Dxa is a crystallite diameter (nm) in an a-axis direction of the same crystal lattice, and π is a circular constant.

2. The magnetic powder for a magnetic recording medium according to claim 1, wherein a Dx ratio represented by the following formula (2) is 2.2 or more:

$$\text{Dx ratio}=\text{Dxa}/\text{Dxc} \quad (2).$$

3. The magnetic powder for a magnetic recording medium according to claim 1 or 2, wherein Bi is contained such that a Bi/Fe molar ratio is within a range of 0.005 to 0.05.

4. A production method of the magnetic powder for a magnetic recording medium according to claim 1 or 2, comprising:

a step of obtaining an intermediate by holding an amorphous body containing Sr as a constituent element of hexagonal barium ferrite at a temperature of 500 to 570° C. for 10 hours or more; and a step of crystallizing the intermediate by heating within a temperature range of 600 to 670° C.

* * * * *